(12) United States Patent
Lu

(10) Patent No.: US 11,202,039 B2
(45) Date of Patent: Dec. 14, 2021

(54) INDICIA AND CAMERA ASSEMBLY FOR A VEHICLE

(71) Applicant: MAGNA ELECTRONICS INC., Auburn Hills, MI (US)

(72) Inventor: Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 554 days.

(21) Appl. No.: 15/964,338

(22) Filed: Apr. 27, 2018

(65) Prior Publication Data

US 2018/0249126 A1 Aug. 30, 2018

Related U.S. Application Data

(63) Continuation of application No. 13/774,315, filed on Feb. 22, 2013, now abandoned.

(60) Provisional application No. 61/601,651, filed on Feb. 22, 2012.

(51) Int. Cl.
*B60R 11/04* (2006.01)
*H04N 7/18* (2006.01)
*B60R 13/00* (2006.01)

(52) U.S. Cl.
CPC ............ *H04N 7/18* (2013.01); *B60R 11/04* (2013.01); *B60R 13/005* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 4,264,144 A | 4/1981 | McCord |
| 5,121,200 A | 6/1992 | Choi |
| 5,533,306 A | 7/1996 | Aspenson |
| 5,550,677 A | 8/1996 | Schofield et al. |
| 5,574,443 A | 11/1996 | Hsieh |
| 5,670,935 A | 9/1997 | Schofield et al. |

(Continued)

FOREIGN PATENT DOCUMENTS

| | | |
|---|---|---|
| JP | 58209635 | 12/1983 |
| JP | 62122844 | 4/1987 |

(Continued)

*Primary Examiner* — Christopher G Findley
(74) *Attorney, Agent, or Firm* — Honigman LLP

(57) ABSTRACT

A vehicle indicia assembly includes a vehicle indicia element having an indicia surface with indicia established thereat and having an attaching surface opposite the indicia surface. The attaching surface of the vehicle indicia element is configured to be mounted at a vehicle with the indicia surface facing outwards away from the vehicle. The vehicle indicia element has a light transmitting portion. A vehicle camera is disposed at the attaching surface of the vehicle indicia element. The vehicle camera is positioned at the vehicle indicia element so that the vehicle camera views through the light transmitting portion and is operable to capture image data. When the vehicle indicia assembly is mounted at a vehicle, the vehicle camera is disposed at the vehicle and views through the light transmitting portion of the vehicle indicia element and is operable to capture image data representative of a scene exterior the vehicle.

26 Claims, 9 Drawing Sheets

(56) References Cited

U.S. PATENT DOCUMENTS

| | | | |
|---|---|---|---|
| 5,680,123 | A | 10/1997 | Lee |
| 5,760,826 | A | 6/1998 | Nayar |
| 5,796,094 | A | 8/1998 | Schofield et al. |
| 5,877,897 | A | 3/1999 | Schofield et al. |
| 6,097,023 | A | 8/2000 | Schofield et al. |
| 6,115,651 | A | 9/2000 | Cruz |
| 6,175,300 | B1 | 1/2001 | Kendrick |
| 6,201,642 | B1 | 3/2001 | Bos |
| 6,226,035 | B1 | 5/2001 | Korein et al. |
| 6,265,984 | B1 | 7/2001 | Molinaroli |
| 6,304,285 | B1 | 10/2001 | Geng |
| 6,313,454 | B1 | 11/2001 | Bos et al. |
| 6,353,392 | B1 | 3/2002 | Schofield et al. |
| 6,396,397 | B1 | 5/2002 | Bos et al. |
| 6,470,273 | B2 | 10/2002 | Halsted et al. |
| 6,498,620 | B2 | 12/2002 | Schofield et al. |
| 6,509,832 | B1 | 1/2003 | Bauer et al. |
| 6,538,827 | B2 | 3/2003 | Bos |
| 6,593,848 | B1 | 7/2003 | Atkins, III |
| 6,614,358 | B1 | 9/2003 | Hutchison et al. |
| 6,690,268 | B2 | 2/2004 | Schofield et al. |
| 6,693,518 | B2 | 2/2004 | Kumata et al. |
| 6,717,610 | B1 | 4/2004 | Bos et al. |
| 6,738,089 | B1 | 5/2004 | Silc |
| 6,757,109 | B2 * | 6/2004 | Bos ............ B60R 1/00 348/118 |
| 6,760,989 | B2 | 7/2004 | Peterson et al. |
| 6,833,822 | B2 | 12/2004 | Klocek et al. |
| 6,856,873 | B2 | 2/2005 | Breed et al. |
| 6,989,736 | B2 | 1/2006 | Berberich et al. |
| 7,005,974 | B2 | 2/2006 | McMahon et al. |
| 7,006,303 | B2 | 2/2006 | Imoto |
| 7,253,833 | B2 | 8/2007 | Imoto |
| 7,359,001 | B2 | 4/2008 | Imoto |
| 7,502,048 | B2 | 3/2009 | Okamoto et al. |
| 7,579,940 | B2 | 8/2009 | Schofield et al. |
| 7,726,434 | B2 | 6/2010 | Pochmuller |
| 7,881,496 | B2 | 2/2011 | Camilleri |
| 7,940,301 | B2 | 5/2011 | Kinoshita |
| 7,965,336 | B2 | 6/2011 | Bingle et al. |
| 8,553,069 | B2 * | 10/2013 | Kweon ........... G03B 37/00 345/647 |
| 8,665,331 | B2 | 3/2014 | Onaka |
| 8,698,894 | B2 | 4/2014 | Briggance |
| 8,922,655 | B2 * | 12/2014 | Forgue ........... B60R 19/52 224/309 |
| 2003/0141972 | A1 | 7/2003 | Yang et al. |
| 2006/0050018 | A1 | 3/2006 | Hutzel et al. |
| 2006/0164230 | A1 | 7/2006 | DeWind et al. |
| 2006/0171704 | A1 | 8/2006 | Bingle et al. |
| 2007/0182817 | A1 | 8/2007 | Briggance |
| 2007/0263090 | A1 | 11/2007 | Abe |
| 2013/0215271 | A1 | 8/2013 | Lu |
| 2014/0218534 | A1 | 8/2014 | Briggance |

FOREIGN PATENT DOCUMENTS

| | | |
|---|---|---|
| JP | 3-61192 | 3/1991 |
| JP | 05213113 | 8/1993 |
| WO | WO 2007/053404 | 5/2007 |

* cited by examiner

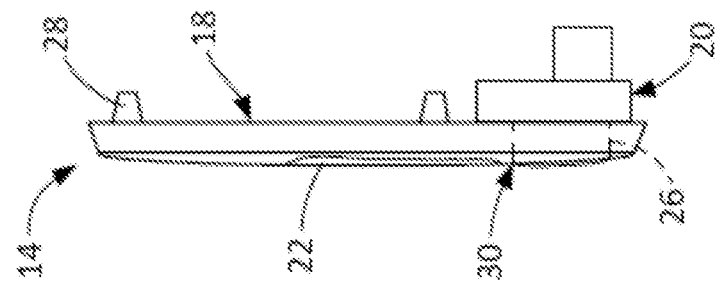
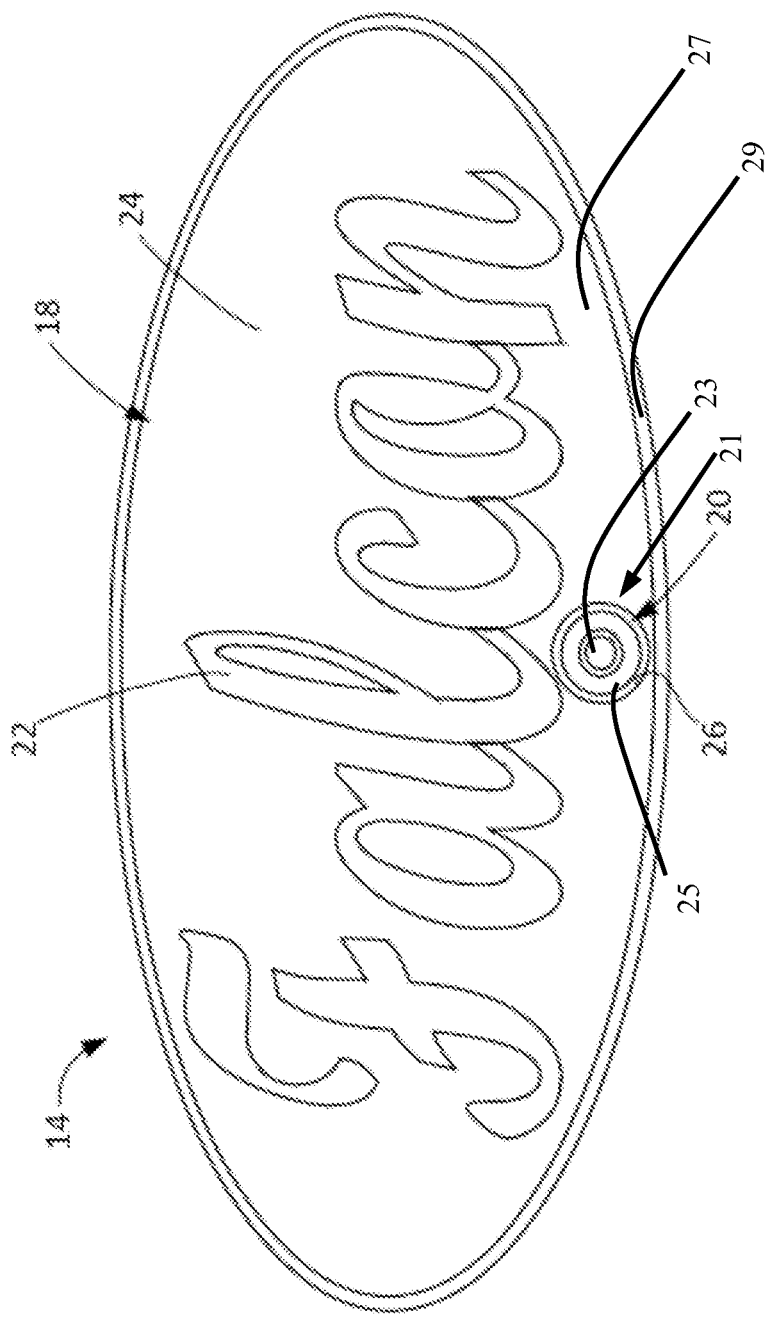

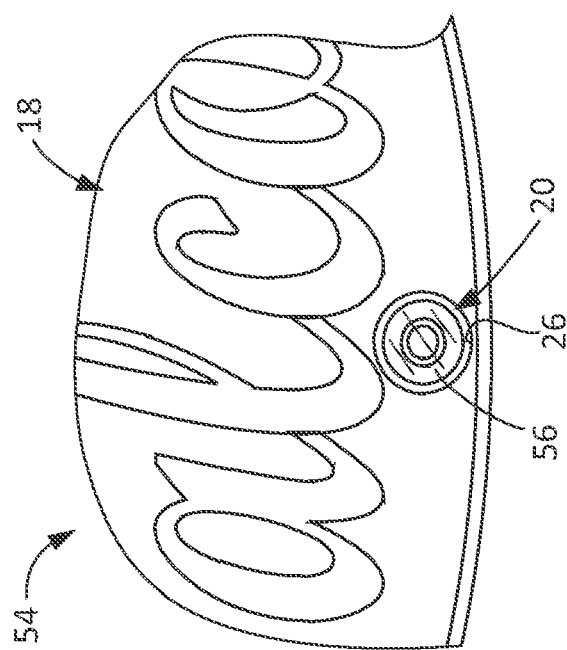

INDICIA AND CAMERA ASSEMBLY FOR A VEHICLE

CROSS REFERENCE TO RELATED APPLICATIONS

The present application is a continuation of U.S. patent application Ser. No. 13/774,315, filed Feb. 22, 2013, which claims the filing benefit of U.S. provisional application, Ser. No. 61/601,651, filed Feb. 22, 2012, which is hereby incorporated herein by reference in its entirety.

FIELD OF THE INVENTION

This disclosure relates to vehicle vision systems, and more particularly, to outward facing vehicle cameras for vehicle vision systems.

BACKGROUND OF THE INVENTION

Outward facing vehicle cameras are often used to capture images of the environment around the vehicle. These images can relay information about driving conditions to the operator of the vehicle in real-time. It is also known for processing of these images to be performed onboard the vehicle to, for example, detect lane markings, assist in parking, and detect obstacles.

External vehicle cameras are known to be located at the front, rear, and sides of the vehicle. Factors such as field of view and manufacturability can be taken into account when positioning vehicle cameras.

SUMMARY OF THE INVENTION

The present invention provides a vehicle indicia or emblem assembly or camera assembly or module or unit or unitary module that includes a camera incorporated in or at a vehicle indicia element or emblem, whereby the assembly or module or unit is configured to be attached to or mounted at a vehicle as an integrated assembly or unit.

According to an aspect of the present invention, a vehicle indicia assembly or camera assembly includes a vehicle indicia or indicia element and a camera. The vehicle indicia element has a light transmitting portion and is configured to be mounted to a vehicle. A vehicle camera is mounted at the vehicle indicia element and positioned at the light transmitting portion (such as an opening or passageway through the vehicle indicia element or a light transmitting portion or window of the vehicle indicia element or the like). The vehicle camera is mounted to the vehicle indicia element, and the indicia assembly or module is mounted to a vehicle as a unit, whereby the camera is operable to capture image data or images representative of a scene exterior the vehicle.

The present application thus provides an indicia or emblem and camera assembly or module that is attachable or mountable at a vehicle body as a unit. When so mounted at the vehicle body, the camera is fixedly disposed at the vehicle and is part of the indicia or emblem that is of the type typically mounted at a vehicle. Thus, the present invention provides a camera at a vehicle without the complicated moving mechanisms to move or extend a camera at a vehicle body from a hidden position (such as behind a vehicle emblem or the like) to an extended operational position (where the emblem is moved out of the way of the camera and the camera is extended from the vehicle body). The indicia or emblem and camera assembly of the present invention may be readily mounted at a vehicle and the camera may be readily connected to an electrical connector or lead when so mounted, in order to electrically connect the camera to the power source of the vehicle and/or to an image processor or control or display of the vehicle.

These and other objects, advantages, purposes and features of the present invention will become apparent upon review of the following specification in conjunction with the drawings.

BRIEF DESCRIPTION OF THE DRAWINGS

The drawings illustrate, by way of example only, embodiments of the present disclosure.

FIG. 2 is a front view of the vehicle indicia assembly or camera assembly;

FIG. 3 is a side view of the vehicle indicia assembly or camera assembly;

FIG. 7 is a front view of part of a vehicle indicia assembly or camera assembly having a light-transmitting window;

DETAILED DESCRIPTION OF THE INVENTION

Figure 1:
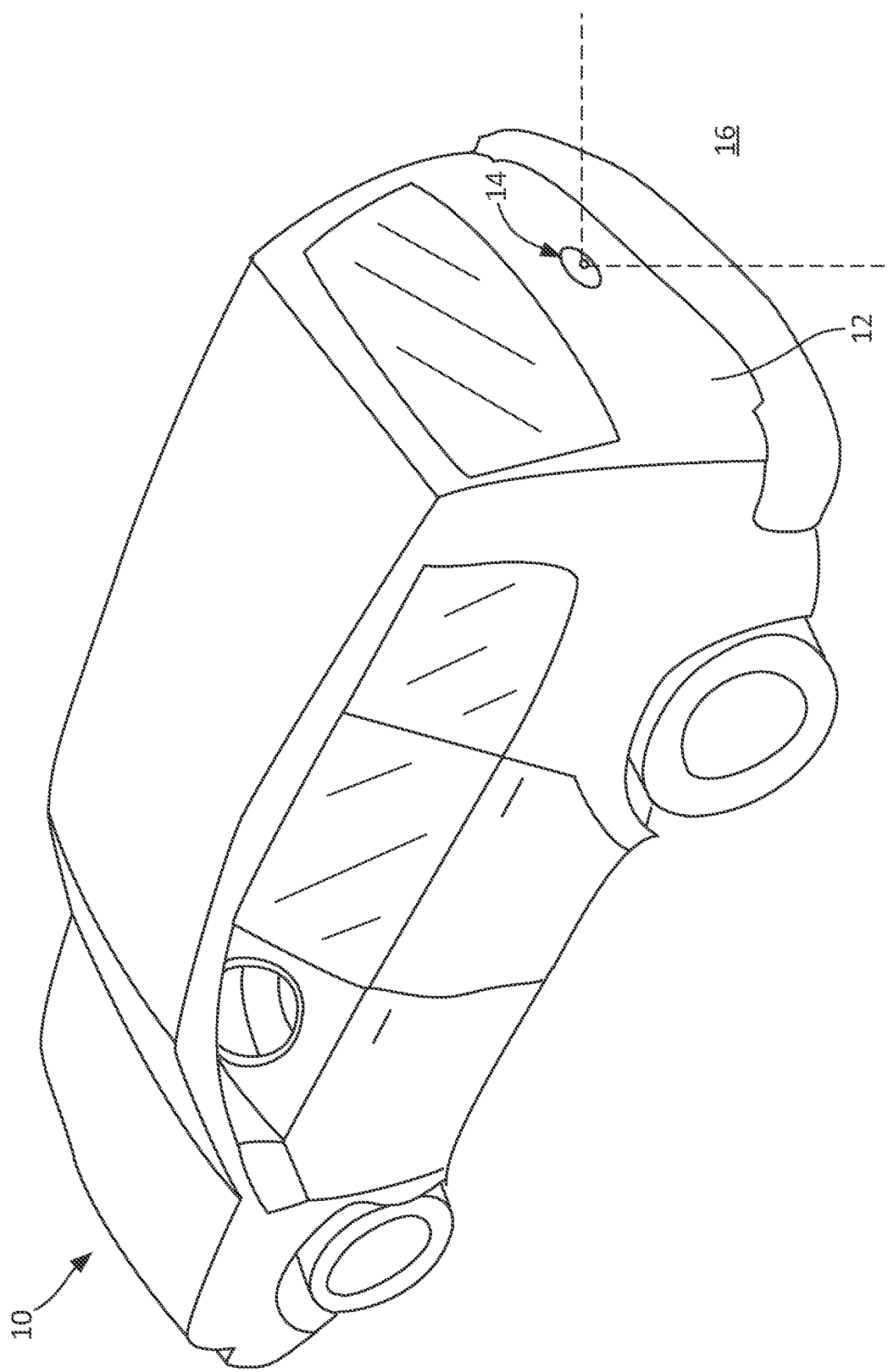
FIG. 1 is a perspective view of a vehicle.

Referring now to the drawings and the illustrative embodiments depicted therein, FIG. 1 shows a vehicle 10, which may comprise a passenger car, such as a sedan or coupe or minivan, as shown, or, in other examples, the vehicle 10 may comprise a sport utility vehicle, truck, van, bus, or other vehicle. The vehicle 10 includes a vehicle body 12 as well as other parts and components. Mounted to an aft portion of the vehicle body 12 is a vehicle indicia or emblem assembly or camera assembly 14. The vehicle indicia assembly or camera assembly 14 is positioned so that the camera 20 disposed thereat has a field of view 16 outside and generally behind or rearward of the vehicle 10. The vehicle indicia assembly or camera assembly 14 is configured with a controller and the vehicle may include a display to provide image information to an operator of the vehicle 10 to assist in operating the vehicle. The vehicle indicia assembly 14 may comprise a backup camera that captures image data in association with a rear backup system or rear vision system or the like.

In another example, a vehicle indicia assembly 14 is additionally or alternatively mounted on the front of the vehicle 10 to capture image information of the environment ahead of the vehicle 10. Similarly, a vehicle indicia assembly 14 can be mounted on a side of the vehicle 10 or anywhere else on the vehicle 10.

With reference to FIG. 2, the vehicle indicia assembly 14 includes a vehicle emblem or indicia or emblem element 18 and a vehicle camera 20 (and the indicia assembly or camera assembly and emblem may utilize aspects of the vision systems described in U.S. Pat. No. 6,989,736 and/or U.S.

patent application Ser. No. 11/672,070, filed Feb. 7, 2007, and published Aug. 9, 2007 as U.S. Publication No. US-2007-0182817, which are hereby incorporated herein by reference in their entireties. The vehicle emblem or indicia element 18 has a selected shape and includes a background portion 24 and a graphical portion 25 on the background portion 24. In this exemplary embodiment, the graphical portion 25 is the name of a fictitious automaker, "Falcon", in script. It will be understood, however, that the graphical portion 25 need not include indicia, or it may include both indicia and non-indicia elements. For example, the graphical portion may include or show the vehicle manufacturer name or logo or identifier or may include the vehicle line or model name or logo or identifier or brand or the like. The background portion 24 may include a main 'matrix' portion 27 and a bezel 29. The bezel 29 may be chromed and so it is preferable to be able to provide the camera in the main 'matrix' portion and not the bezel 29 since it may be more difficult to match the coloration of the lens 23 to the chromed bezel 29.

The vehicle emblem or indicia element 18 can be made of plastic, metal, other material, or a combination of materials. For example, the background portion 24 may be made of plastic, and the graphical portion 25 may be a metallic element about which the background portion 24 is molded. Alternatively, the graphical portion 25 could be applied to the background portion 24 by means of electroplating, or the like. The background portion 24 and the graphical portion 25 can each have one or more suitable surface finishes or colors. In some embodiments, the emblem or indicia element 18 may not include a background portion 24.

The vehicle camera 20 is preferably a video camera mounted to the vehicle emblem or indicia element 18. The vehicle camera is positioned at an opening or passageway 26 in the vehicle emblem or indicia element 18, and faces outwards to capture image data representative of a scene exterior or outside the vehicle 10. The vehicle camera 20 may utilize aspects of the cameras described in U.S. Publication No. 2009/0244361, PCT publication WO2011/014497 and U.S. Pat. No. 7,280,124, which are hereby incorporated herein by reference in their entireties.

As can be seen in FIG. 2, the opening 26 in the vehicle emblem or indicia element 18 does not intersect or run through the graphical portion 25. That is, the opening 26 does not detrimentally affect the appearance of the graphical portion 25. In this example, the opening only penetrates the background portion 24 of the vehicle emblem or indicia element 18.

The vehicle camera 20 includes a lens assembly 21, which includes both a lens 23 and a lens barrel 25. The lens 23 may be made from one or more lens elements. One or more of the lens elements may be provided principally to assist in the focusing of incident light rays on the image sensor. One or more of the lens elements may be provided for other purposes, such as simply as a protective window to permit the pass-through of light while protecting other, perhaps more sensitive lens elements from damage from weather, dirt, and the like. One or both components of the lens assembly 21 are visible through an opening 26 in the vehicle emblem or indicia element 18, but may be configured to match the material of the emblem or indicia element 18 that surrounds the opening 26. The term "match" as used in this disclosure is not limited to the concept of exactly matching, and is intended to describe approximate matches as well. In this example, at least a portion of the lens assembly 21 is made the same color as the background portion 24. For example, the outermost surface of the lens 23 is at least partially coated with an optical coating of a color that matches the vehicle emblem or indicia element 18 at or around the opening 26. Such an optical coating can allow the lens 23 to appear with somewhat opaque coloring from the outside, but still allow light to enter the camera 20. Since optical coatings may not be available in a color that precisely matches the color of the emblem or indicia element 18 at or around the opening (the color of the background 24 in this example), a nearly matching color can be selected. So, while the lens 23 may not perfectly blend in to the background 24, it blends in enough so that a casual observer may not notice the vehicle camera 20. In other examples, the lens assembly includes the same material or is given the same surface finish as the surrounding region of the vehicle emblem or indicia element 18. In still other examples, the lens barrel 25 is alternatively or additionally made to match the background 24 so that the lens assembly 21 blends in to the surrounding region of the vehicle emblem or indicia element 18.

The opening 26 may in some embodiments be about 15 mm in diameter, or smaller or larger in some cases. Preferably, the opening is sized to fit both the lens 23 and the barrel 25 so that the outer optic of the lens 23 sits generally flush or coplanar with the background 24 of the emblem or indicia element, however it is possible for the opening 26 to be sized only to surround the lens 23 and to hide the barrel 25 (with the barrel disposed behind the indicia element and the lens or optics received in the passageway through the indicia element.

FIG. 3 shows the vehicle indicia assembly 14 from the side. The vehicle indicia element 18 is configured to be mounted to the vehicle body 12 (with the indicia surface 22 facing outwards) by one or more mounting protrusions 28, such as pins or pegs, that extend rearward of the vehicle indicia element 18. The mounting protrusions 28 mate with holes or fixtures in the vehicle body 12 to securely hold the vehicle indicia element 18 to the body 12 (and may include tabs or prongs that snap or otherwise attach the vehicle emblem or indicia element at the body of the vehicle). The vehicle body 12 may also be provided with an opening or cavity to accommodate the vehicle camera 20. In other examples, other kinds of attachment features can be used in addition or alternatively to the protrusions 28. Optionally, the camera may be configured to be received at a recess of the indicia element so as to not protrude rearward therefrom, whereby no additional opening or cavity is needed at the vehicle to accommodate the emblem/indicia and camera assembly or unitary module (in such an application, the indicia element may comprise a thicker element to accommodate the camera therein).

In the example shown in FIG. 3, the outer surface of the lens assembly of the vehicle camera 20 is generally flush with an edge of the opening 26, as indicated at 30. That is, the lens assembly of the vehicle camera 20 does not substantially protrude from the background portion 24 nor is the lens assembly substantially recessed into the background portion 24. While the curvature of a lens optic of the vehicle camera 20 may require the lens to protrude slightly from the vehicle indicia element 18, such protrusion is still considered generally flush when small enough. In addition, such protrusion can be compensated for by slightly recessing the vehicle camera 20, which again is considered generally flush. In other examples, the lens assembly of the vehicle camera 20 can significantly protrude from or be recessed into the vehicle indicia element 18.

Figure 4:
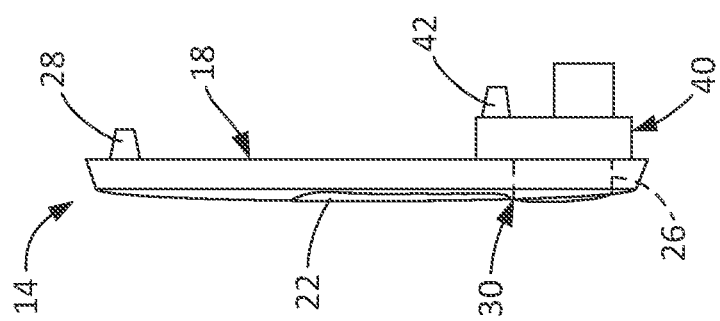
FIG. 4 is a side view of the vehicle camera separated from the vehicle indicia element.

FIG. 4 shows the vehicle camera 20 separated from the vehicle indicia element 18. The vehicle camera 20 includes a housing 32, which can be made of plastic or other material, and the lens assembly 36, which contains one or more lenses. The housing 32 holds other components of the vehicle camera 20 including the aforementioned image sensor, which may be, for example, a charge-coupled device (CCD) or complementary metal-oxide-semiconductor (CMOS) device. The vehicle camera 20 further includes an electrical connector 34 for connection of electrical wiring that runs to a camera controller. In another example, the electrical connector 34 is replaced by a wireless module for wireless communication between the vehicle camera 20 and the camera controller. Optionally, the electrical connector 34 may be replaced by a wire harness directly attaching at the rear part of camera body and having an electrical connector at the other end of the wire harness for electrical connection to other wiring or circuitry or connectors.

Figure 5:
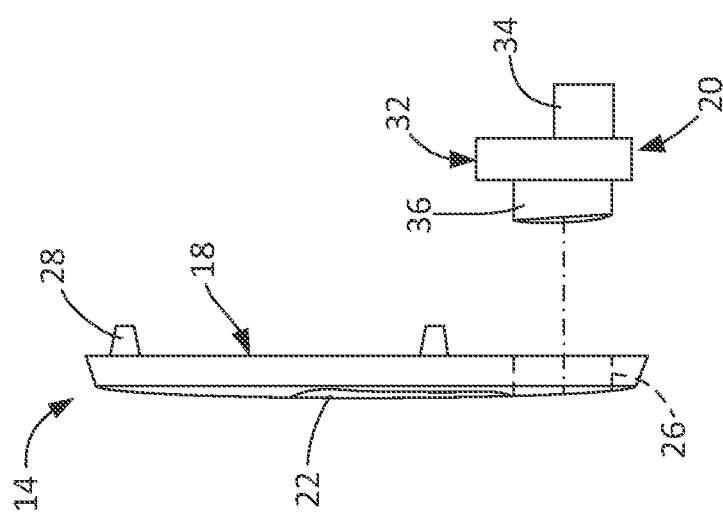
FIG. 5 is a side view of another vehicle indicia assembly or camera assembly with another vehicle camera.

FIG. 5 shows the vehicle indicia assembly 14 with another vehicle camera 40. The vehicle camera 40 is similar to the vehicle camera 20, and for the sake of brevity, description will not be repeated. Features and aspects of the vehicle camera 20 can be used with the vehicle camera 40.

The vehicle camera 40 has a housing configured to mount the vehicle indicia assembly 14 to the body 12 of the vehicle 10. In this example, the vehicle camera 40 includes one or more protrusions 42, such as pins or pegs, that extend rearward of the vehicle indicia element 18. The mounting protrusion 42 mates with a hole or fixture in the vehicle body 12 to securely hold the vehicle indicia assembly 14 to the body 12. The mounting protrusion 42 of the vehicle camera 40 can be used in addition to or in place of protrusions 28 on the vehicle indicia element 18. In other examples, another kind of attachment feature can be used in addition or alternatively to the protrusion 42.

Referring to FIGS. 1, 3 and 4, a method of mounting a vehicle camera to a vehicle is now described. First, a vehicle camera, such as the camera 20, is mounted to a vehicle emblem or indicia element, such as the emblem or indicia element 18 (see FIGS. 4 and 3). The vehicle camera 20 is mounted so that the lens assembly 36 is positioned at the opening 26 in the vehicle indicia element 18. The vehicle camera 20 can be secured to the vehicle indicia element 18 by screws, bolts, an adhesive, a press fit, a snap fit or attachment or the like. A plurality of the resulting vehicle camera assemblies 14 can be stocked near a vehicle assembly line. Then, an electrical connector of the vehicle camera 20, such as the connector 34, can be connected to the electrical system of the vehicle 10. For example, an electrical lead or connector of the camera or of a vehicle wiring harness may be fed through an opening or aperture or passageway at the vehicle body to electrically connect camera circuitry to the vehicle wiring harness.

Next, the vehicle indicia assembly 14 is mounted to a vehicle being assembled, such as the vehicle 10 (see FIG. 1). In one example, protrusions 28, or other mounting parts, of the vehicle indicia element 18 are fixed to the vehicle body 12. In another example, protrusions 42, or other mounting parts, of the housing of the vehicle camera 40 are fixed to the vehicle body 12. The vehicle indicia assembly 14 is mounted with an emblem or indicia surface 22 of the vehicle indicia element 18 facing outwards. The vehicle camera 20 thus also faces outwards in order to capture images through the opening 26 during subsequent operation of the vehicle 10. Optionally, the electrical connection of the camera circuitry to the vehicle wiring harness may be made when the indicia assembly is mounted at the vehicle, such as via a plug and socket connection to a connector that is fixedly disposed at the emblem or indicia element mounting area of the vehicle so that, when the indicia assembly is snapped or adhered or otherwise attached at the vehicle, the electrical connection is also made.

The above method demonstrates that a vehicle camera can be mounted to a vehicle quickly and efficiently or with fewer steps and less time on the assembly line than with other methods.

Figure 6B:
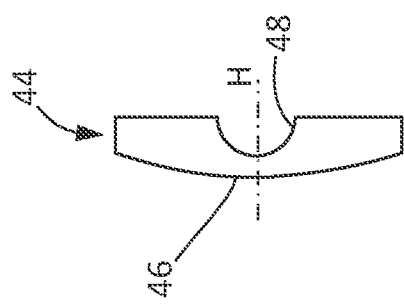
FIG. 6*b* is a side view of the lens.
Figure 6A:
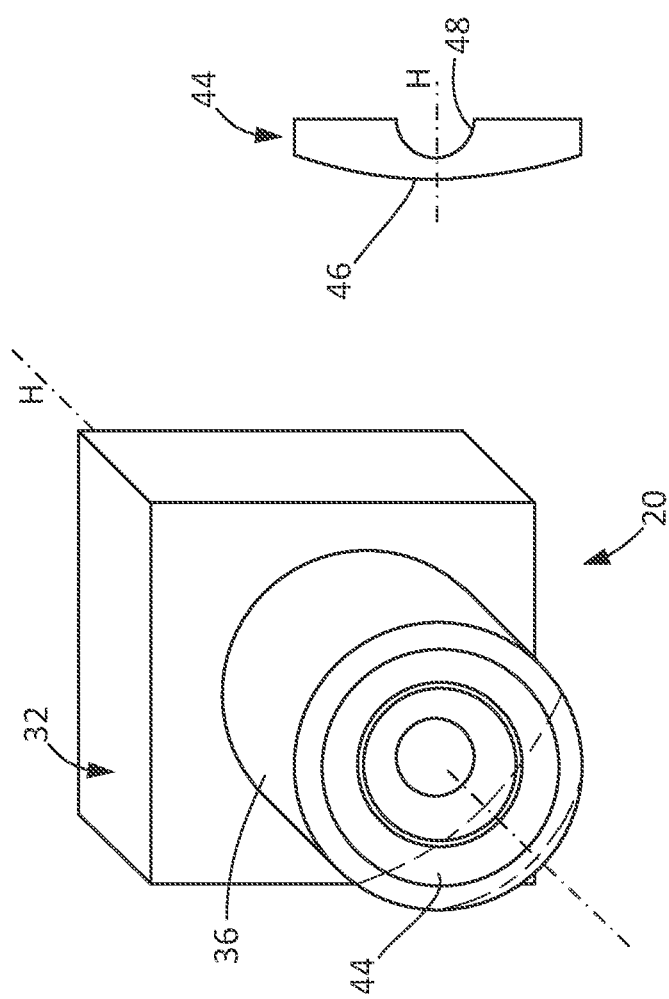
FIG. 6*a* is a perspective view of the vehicle camera.

FIGS. 6a and 6b show details of the vehicle camera 20. A forward-most lens 44 of the lens assembly 36 is shown. The lens 44 can have a curvature that approximates the curvature of the vehicle indicia element 18 at the opening 26 to make the lens 44 as flush as practical with the vehicle indicia element 18. In this example, an outward-facing surface 46 of the lens 44 has curvature shaped to approximate the curvature of the vehicle indicia element 18. Approximating curvature in this way still takes into account the optical performance required from the lens 44. Curvature of an inward-facing surface 48 can be selected to allow for a better approximation of curvature for the outward-facing surface 46.

In this example, the forward-most lens 44 a wide-angle lens, such as a wide angle lens providing a field of view of at least about 130 degrees and preferably the wide angle lens comprises a 180-degree lens having a field of view of at least about 180 degrees. Accordingly, the vehicle camera 20 can be positioned relative to the vehicle indicia element 18 to horizontally align the lens 44 when the vehicle indicia element 18 is mounted to the vehicle 10. That is, the vehicle camera 20 and lens 44 are aligned with a horizontal axis H that is generally parallel to a flat road. This allows the vehicle indicia element 18 to be mounted in the expected vertical or nearly vertical manner.

In other examples, any of the vehicle indicia assembly 14, camera 20, lens assembly 36, and forward-most lens 44 can be tilted downward slightly with respect to the horizontal axis H.

In some embodiments, the lens 23 may comprise a 135-degree lens, which has a horizontal field of view of about 135 degrees and a selected vertical field of view of about 90-110 degrees, and requires a relatively small amount of dewarping of the raw images prior to displaying the camera images on an in-cabin display. However, in many applications, it is considered important for the camera 20 to capture a portion of the vehicle bumper so that the vehicle occupants have a point of reference in the images displayed on the in-cabin display. As a result, 135-degree cameras typically are mounted at least a selected angle (such as, for example, about 30-45 degrees) down from the horizontal to ensure that they capture the vehicle bumper in their vertical field of view. This can be problematic in some instances when trying to orient the lens assembly 21 so that it match the curvature of the surrounding portion of the vehicle indicia element 18. In some embodiments, however, the lens 23 provided may be a 180-degree lens. A 180-degree lens requires a greater amount of dewarping of the raw images, and thus could constitute a greater computational load on whatever controller is used to control it, however it also has a relatively greater vertical field of view than a 135-degree lens (such as, for example, about 144 degrees vertically) which would permit greater flexibility in the angle from the vertical at which it is oriented. In some embodiments (such as, for example, for some vehicles, and for some lenses) a 180 degree lens could be mounted about 15 degrees or even less down from horizontal and still capture a portion of the vehicle bumper. A camera would be useful for the purposes described herein even if its vertical field of view were less than 144 degrees. For example, a camera would have greater flexibility for the purposes of blending with the curvature of a typical vehicle emblem or indicia element if its vertical field of view were greater than about 125 degrees. It will be noted that the use of a 180-degree lens is advantageous as described herein but is not obvious since it is not necessarily used for the purpose of displaying a horizontal field of view on the in-cabin display that is any greater than the horizontal field of view that would be shown by a camera having a 135 degree lens.

FIG. 7 shows a vehicle indicia assembly or camera assembly 54 having a light-transmitting window 56 established at the indicia element. The vehicle indicia assembly 54 is similar to the vehicle indicia assembly 14, and for the sake of clarity, description will not be repeated. Features and aspects of the vehicle indicia assembly 14 can be used with the vehicle indicia assembly 54.

The light-transmitting window 56 can be made of a material or given a coating to match the color of the vehicle indicia element 18 at or around the opening 26. For example, the light-transmitting window 56 can be a tinted piece of clear plastic or glass. The light-transmitting window 56 can have the shape of a flat disc. Since, in this example, the curvature of the vehicle indicia element 18 at or around the opening 26 is slight, the flat light-transmitting window 56 approximates the curvature of the vehicle indicia element at the opening. In other examples, the light-transmitting window 56 can be given positive curvature. The optical effect of the light-transmitting window 56 can be compensated for by the optical design of the vehicle camera 20. The light-transmitting window 56 can be considered an optical element of the lens assembly 36.

Figure 8:
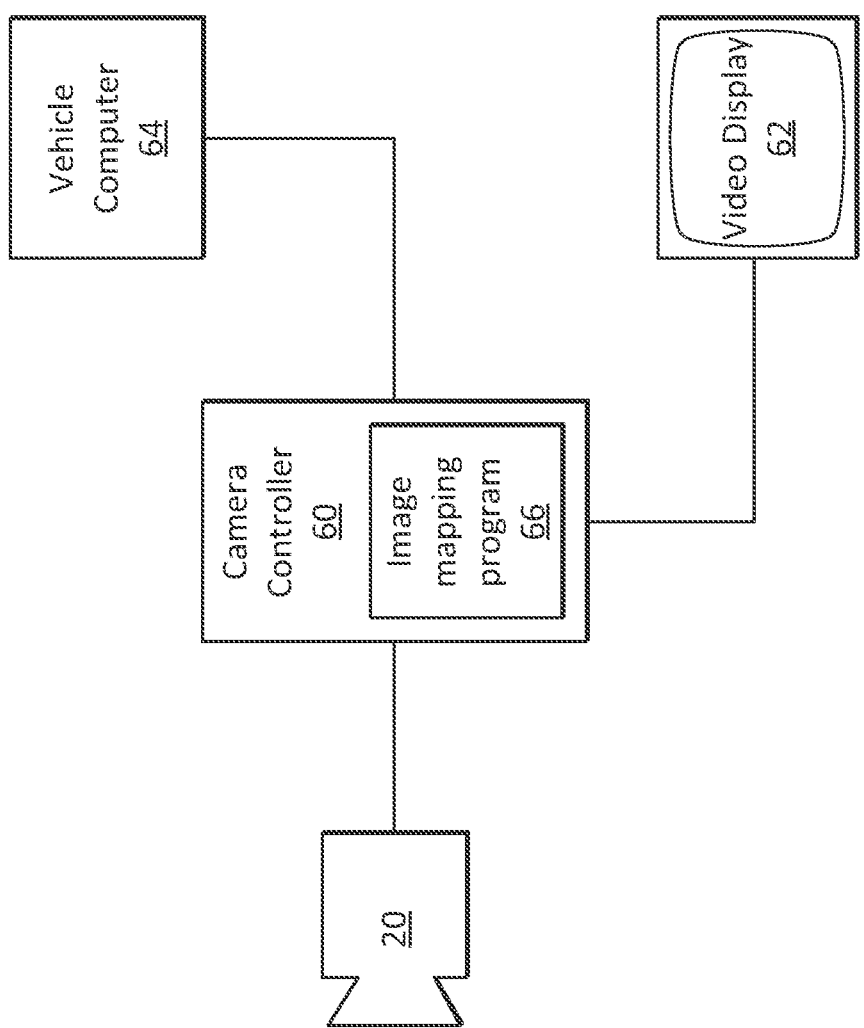
FIG. 8 is a functional block diagram of a portion of the electrical system of the vehicle.

FIG. 8 shows components of the electrical system of the vehicle 10 related to the vehicle camera 20. The vehicle camera 20 is electrically connected to a camera controller 60, which controls operation of the camera 20, such as controlling the functions of video capture, object detection, overlays, and similar. The camera controller 60 is connected to a video display 62 and a vehicle computer 64.

Figure 11B:
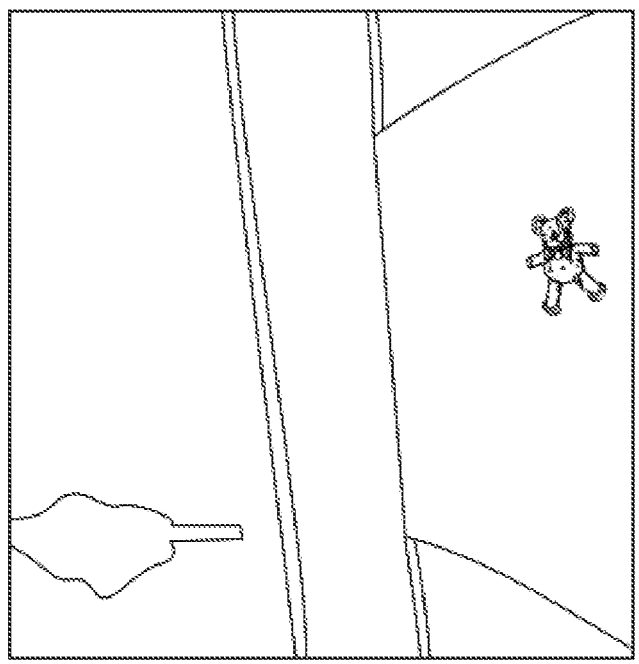
FIGS. 11*a* and 11*b* are illustrations related to the image mapping program of the camera controller.
Figure 11A:
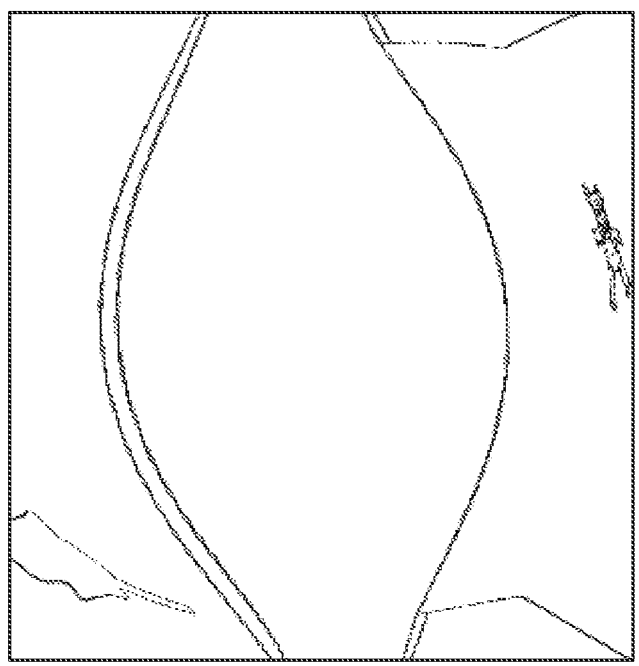

The camera controller 60 may reside outside of vehicle camera 20 or may comprise an integrated part of the vehicle camera, in which case the camera 20 and camera controller 60 may share the same enclosure or body. In the case of an outside of the vehicle camera enclosure, a separate camera controller enclosure or box or housing with electrical connectors may be mounted at an appropriate place at or in the vehicle. The camera controller 60 can be operable to adjust image data captured by the vehicle camera 20 to compensate for optical distortion resulting from the lens 44. When the camera of the vehicle indicia assembly 14 is used as a backup camera, it is of specific interest to compensate for optical distortion below the horizontal, so as to allow the vehicle operator to see obstacles in the rear blind-spot. The camera controller 60 can include an image mapping program 66 that remaps curvilinear images distorted by the lens 44 (see FIG. 11a) to another projection, such as a rectilinear projection (see FIG. 11b). Such a program can be stored in a memory of the camera controller 60 and executed on each image of video captured by the camera 20 before the video is output to the video display 62. The camera controller 60 can thus generate images that convey information similar to that provided by backup cameras that are angled downwards.

The image mapping program 66 can be a standalone program or a subroutine, function, class, or object of a larger camera control program. The image mapping program 66 can be another kind of programmatic entity. The memory that stores the image mapping program 66 can be a read-only memory (ROM), a random-access memory (RAM), or the like.

The video display 62 can include a monitor or screen positioned for viewing by the operator of the vehicle. The camera controller 60 outputs raw or processed video to the video display 62 to aid the operator in driving the vehicle 10.

The vehicle computer 64 is configured to send control commands to the camera controller 60. The vehicle computer 64 also controls other aspects of operation of the vehicle 10, as is known.

Figure 9:
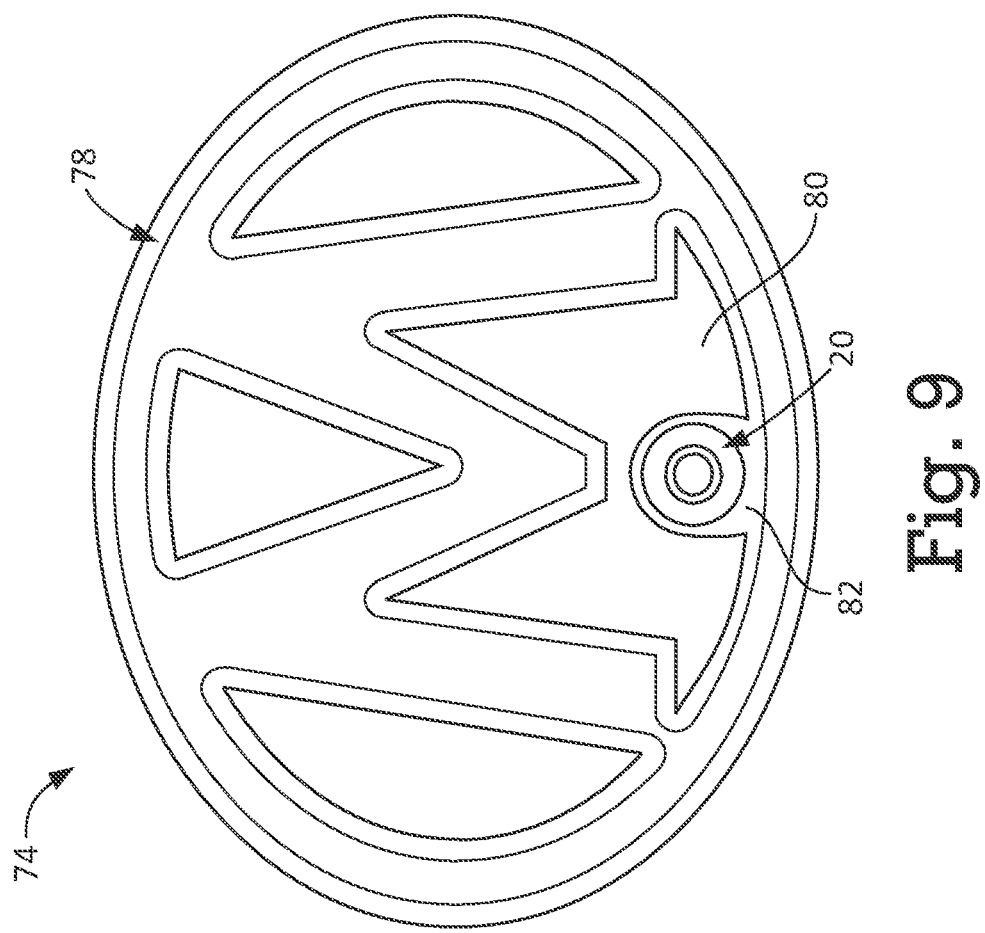
FIG. 9 is a front view of another vehicle indicia assembly or camera assembly.

FIG. 9 shows another vehicle emblem or indicia assembly or camera assembly 74. The vehicle indicia assembly 74 is similar to the vehicle indicia assembly 14, and for the sake of clarity, description will not be repeated. Features and aspects of the vehicle indicia assembly 14 can be used with the vehicle indicia assembly 74.

The vehicle indicia assembly 74 includes a vehicle emblem or indicia element 78 which itself defines an emblem or indicia surface. The vehicle indicia element 78 can be a piece of plastic that is electroplated. The vehicle indicia element 78 defines openings 80 through which, when mounted, some interior cavity is visible, which may appear black to a passerby. The vehicle indicia element 78 may include a tab 82 to which a vehicle camera 20 is fixed. The tab 82 and the lens assembly 21 may substantially be black. The vehicle camera 20 can be as described in the other examples and, for instance, can have a housing that extends into a cavity or hole in the vehicle body 12.

Figure 10:
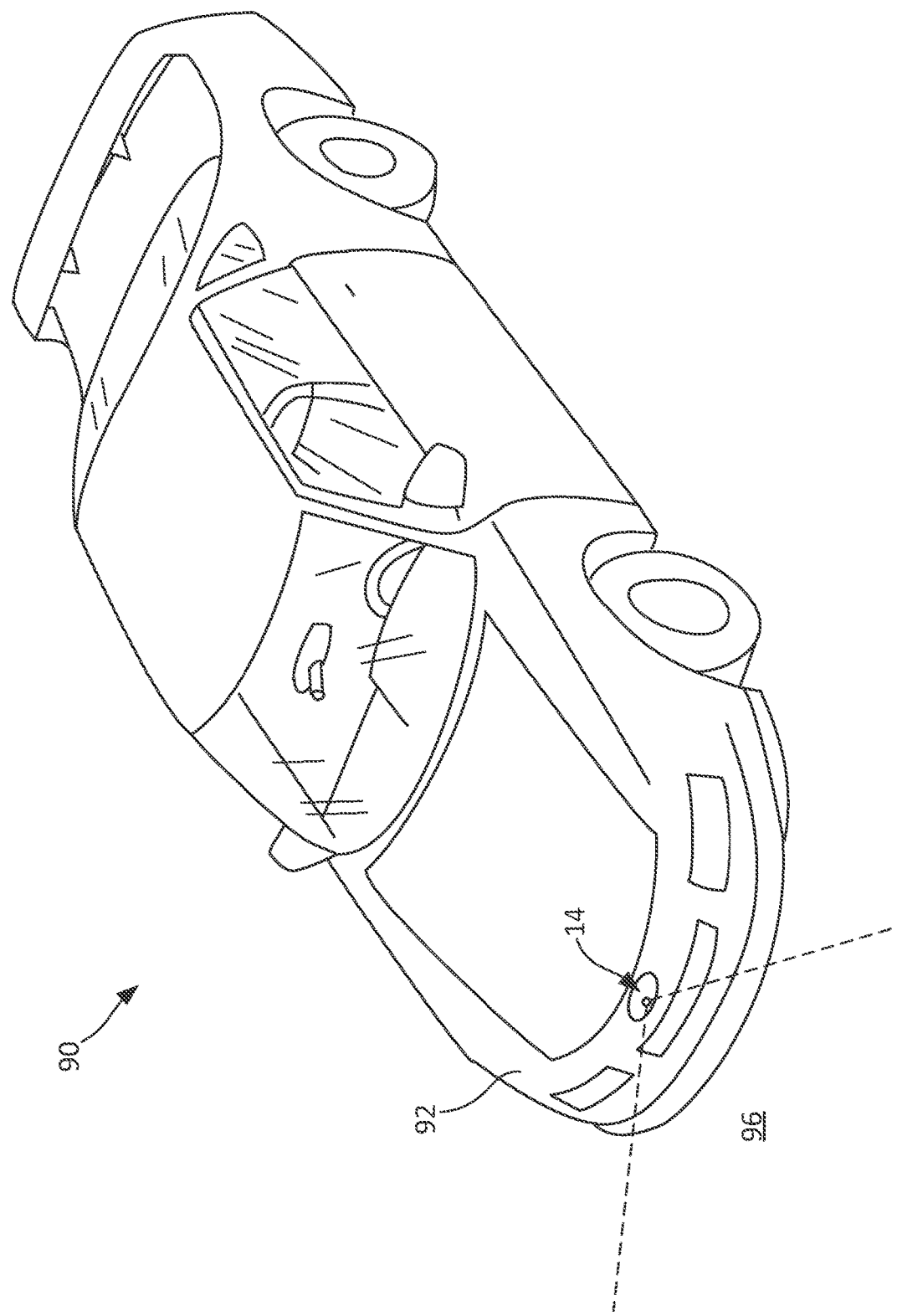
FIG. 10 is a perspective view of another vehicle.

FIG. 10 shows another vehicle 90 according to another example. The vehicle 90 can be a car, as shown. In other examples, the vehicle 90 is a truck, van, bus, or other vehicle. The vehicle 90 includes a vehicle body 92 as well as other parts and components. Mounted to a forward portion of the vehicle body 92 is a vehicle emblem or indicia assembly or camera assembly, such as the emblem or indicia or camera assembly 14. The vehicle indicia assembly 14 is positioned to have a field of view 96 outside and generally ahead of the vehicle 10 to assist the operator in driving the vehicle.

Optionally, a vehicle emblem or indicia assembly or camera assembly of the present invention may include (or may be associated with) a lens or window cleaning device, which is operable to clean or remove dirt or debris or water or the like from the indicia element at the light transmitting portion of the indicia element. For example, the indicia assembly or unitary indicia/camera module may include a spraying device that is operable to spray fluid or air at the light transmitting portion of the indicia element to clear debris or the like from the outer surface of the indicia element or lens so that the camera has a clearer view through the light transmitting portion of the indicia element. The cleaning or spraying device may be incorporated into the indicia assembly or module or may be disposed at the vehicle at or near the indicia assembly or module. The cleaning device may utilize aspects of the cleaning devices described in U.S. Pat. No. 7,965,336 and/or U.S. provisional application Ser. No. 61/713,772, filed Oct. 15, 2012, which are hereby incorporated herein by reference in their entireties.

The vehicle emblem or indicia assemblies or modules or camera assemblies or modules described herein can allow for more efficient use of space on vehicle bodies. A dedicated camera-only space is no longer needed on the body, which frees up space for other components.

The vehicle emblem or indicia assemblies or camera assemblies described herein can allow for the vehicle emblem or indicia element to be mounted approximately vertically and the camera to be approximately horizontal, while providing a field of view suitable for a backup camera.

In addition, the vehicle emblem or indicia assemblies or camera assemblies described herein can be made to not significantly protrude from the vehicle body, which can reduce the chance of damage to camera. The indicia and camera assembly or module is fixedly disposed at the vehicle such that the camera is fixed relative to the vehicle and is part of the emblem or indicia element that is of the type typically mounted at a vehicle. Thus, the present invention provides a camera at a vehicle with no moving parts and without the complicated moving mechanisms to move or extend a camera at a vehicle body from a hidden position (such as behind a vehicle emblem or the like) to an extended operational position (where the emblem is moved out of the way of the camera and the camera is extended from the vehicle body). The emblem or indicia element and camera assembly of the present invention may be readily mounted at a vehicle and the camera may be readily connected to an electrical connector or lead when so mounted, in order to electrically connect the camera to the power source of the vehicle and/or to an image processor or control or display of the vehicle.

According to one aspect of this disclosure, a vehicle emblem or indicia assembly or camera assembly includes a vehicle emblem or indicia element and a vehicle camera mounted to the vehicle emblem or indicia element. The vehicle indicia element has at least one indicia surface shaped as a vehicle emblem or indicia element. The vehicle indicia element is configured to be mounted to a vehicle with the indicia surface facing outwards. The vehicle indicia element has a light transmitting portion, such as an opening or passageway therethrough or a light transmitting window thereat. The vehicle camera is positioned at the light transmitting portion and faces outwards to capture images of a scene exterior the vehicle.

At least a portion of a lens assembly of the vehicle camera can match the vehicle emblem or indicia element at or around the light transmitting portion or opening. An optical element of the lens assembly can be at least partially coated with an optical coating that matches the vehicle indicia element at or around the light transmitting portion or opening. An optical element of the lens assembly can include a material that matches the vehicle indicia element at or around the light transmitting portion or opening. At least a portion of a lens assembly of the vehicle camera can be flush with an edge of the light transmitting portion or opening in the vehicle indicia element. At least a portion of a lens assembly of the vehicle camera can have curvature that approximates curvature of the vehicle indicia element at the opening. A lens of the lens assembly can have an outward-facing surface having curvature shaped to approximate the curvature of the vehicle indicia element at the opening. The light transmitting portion of the vehicle indicia element may comprise a light transmitting window that is not an opening through the indicia surface. The light transmitting window may comprise a material that is substantially light transmissive to allow light to pass through the window to the camera disposed behind the window.

The vehicle camera may be positioned relative to the vehicle indicia element to horizontally align the lens when the vehicle indicia element is mounted to the vehicle.

A camera controller may further be provided and operable to adjust image data captured by the vehicle camera to compensate for optical distortion. The camera controller may be operable to adjust image data captured by the vehicle camera to compensate for optical distortion below the horizontal.

The vehicle camera may include a housing configured to mount the vehicle indicia assembly to a body of the vehicle.

According to another aspect of this disclosure, a vehicle includes a vehicle body and any of the vehicle camera assemblies above.

According to yet another aspect of this disclosure, a method of mounting a vehicle emblem or indicia element and camera to a vehicle includes, first, mounting the vehicle camera to a vehicle indicia element to form a vehicle emblem or indicia assembly module or unit. The vehicle camera is positioned at a light transmitting portion of the vehicle indicia element. The method further includes mounting the vehicle indicia assembly to the vehicle as a unit with an indicia surface of the vehicle indicia element facing outwards. The vehicle camera thus also faces outwards to capture images through the light transmitting portion of the vehicle indicia element. Mounting the vehicle indicia assembly to the vehicle may include mounting a housing of the vehicle camera to a body of the vehicle.

Therefore, the present invention provides a camera and emblem or indicia assembly or module or unit that has a camera or imager or sensor incorporated into a vehicle emblem or vehicle emblem element or indicia element. The vehicle indicia assembly or module, with the camera incorporated in or at the vehicle indicia element, may be readily mounted at a rear portion of a vehicle (or at a front or side portion or elsewhere at a vehicle, depending on the particular application and desired field of view of the camera) as a unit, whereby the camera may be electrically connected to a vehicle wiring harness and/or vehicle network bus or the like (or the camera may wirelessly communicate with a vision system or vehicle network bus or the like) as the indicia element is mounted at the vehicle (such as at an exterior panel of the vehicle or the like).

The emblem or indicia assembly or module may include or may be associated with an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066571, filed Nov. 27, 2012, and published Jun. 6, 2013 as International Publication No. WO 2013/081985, which is hereby incorporated herein by reference in its entirety.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least about 640 columns and 480 rows (at least about a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and published Feb. 7, 2013 as International Publication No. WO 2013/019707, and/or PCT Application No. PCT/US2012/048110, filed Jul. 25, 2012, and published Jan. 31, 2013 as International Publication No. WO 2013/016409, and/or PCT Application No. PCT/CA2012/000378, filed Apr. 25, 2012, and published No. 1, 2012 as International Publication No. WO 2012/145822, and/or PCT Application No. PCT/US2012/056014, filed Sep. 19, 2012, and published Mar. 28, 2013 as International Publication No. WO 2013/043661, and/or PCT Application No. PCT/US12/57007, filed Sep. 25, 2012, and published Apr. 4, 2013 as International Publication No. WO 2013/048994, and/or PCT Application No. PCT/US2012/061548, filed Oct. 24, 2012, and published May 2, 2013 as International Publication No. WO 2013/063014, and/or PCT Application No. PCT/US2012/062906, filed Nov. 1, 2012, and published May 10, 2013 as International Publication No. WO 2013/067083, and/or PCT Application No. PCT/US2012/063520, filed Nov. 5, 2012, and published May 16, 2013 as International Publication No. WO 2013/070539, and/or PCT Application No. PCT/US2012/064980, filed Nov. 14, 2012, and published May 23, 2013 as International Publication No. WO 2013/074604, and/or PCT Application No. PCT/US2012/066570, filed Nov. 27, 2012, and published Jun. 6, 2013 as International Publication No. WO 2013/081984, and/or PCT Application No. PCT/US2012/066571, filed Nov. 27, 2012, and published Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2012/071219, filed Dec. 21, 2012, and published Jul. 11, 2013 as International Publication No. WO 2013/103548, and/or PCT Application No. PCT/US2013/022119, filed Jan. 18, 2013, and published Jul. 25, 2013 as International Publication No. WO2013/109869, and/or PCT Application No. PCT/US2013/026101, filed Feb. 14, 2013, and published Aug. 22, 2013 as International Publication No. WO 2013/123161, and/or U.S. patent application Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, published Jan. 3, 2013 as U.S. Publication US-2013-0002873, and/or U.S. provisional applications, Ser. No. 61/766,883, filed Feb. 20, 2013; Ser. No. 61/760,368, filed Feb. 4, 2013; Ser. No. 61/760,364, filed Feb. 4, 2013; Ser. No. 61/758,537, filed Jan. 30, 2013; Ser. No. 61/754,8004, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/676,405, filed Jul. 27, 2012; Ser. No. 61/666,146, filed Jun. 29, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/602,876, filed Feb. 24, 2012; and/or Ser. No. 61/601,669, filed Feb. 22, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published Jan. 31, 2013 as International Publication No. WO 2013/016409, and/or U.S. patent application Ser. No. 13/534,657, filed Jun. 27, 2012, published Jan. 3, 2013 as U.S. Publication US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; and/or 7,720, 580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526, 103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226, 628, filed Sep. 14, 2005 and published Mar. 23, 2006 as U.S. Publication No. US-2006-0061008, and/or Ser. No. 12/578, 732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370, 983; 7,329,013; 7,308,341; 7,289,037; 7,249,860; 7,004, 593; 4,546,551; 5,699,044; 4,953,305; 5,576,687; 5,632, 092; 5,677,851; 5,708,410; 5,737,226; 5,802,727; 5,878, 370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012, and published Feb. 7, 2013 as International Publication No. WO 2013/0197595, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and published No. 1, 2012 as International Publication No. WO 2012/145822, and/or PCT Application No. PCT/US2012/066571, filed Nov. 27, 2012, and published Jun. 6, 2013 as International Publication No. WO 2013/081985, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the foregoing provides certain non-limiting example embodiments, it should be understood that combinations, subsets, and variations of the foregoing are contemplated. The monopoly sought is defined by the claims.

The invention claimed is:

1. A vehicle indicia assembly suitable for use on a vehicle, the vehicle indicia assembly comprising:
   a vehicle indicia element, the vehicle indicia element having an indicia surface with indicia established thereat, wherein the vehicle indicia element has an attaching surface opposite the indicia surface;
   wherein the attaching surface of the vehicle indicia element is configured to be mounted at a vehicle so that, when the vehicle indicia element is mounted at the vehicle, the indicia surface faces outwards away from the vehicle;
   wherein the vehicle indicia element has a light transmitting portion, and wherein the light transmitting portion comprises a light transmitting plastic element having an outer surface curvature that corresponds with the indicia surface around the light transmitting portion;
   a vehicle camera disposed at the attaching surface of the vehicle indicia element, wherein the vehicle camera is positioned at the vehicle indicia element and behind the light transmitting portion so that the vehicle camera views through the light transmitting portion and is operable to capture image data; and
   wherein, when the vehicle indicia assembly is mounted at the vehicle, the vehicle camera is disposed at the vehicle and views through the light transmitting portion of the vehicle indicia element and is operable to capture image data representative of a scene exterior the vehicle.

2. The vehicle indicia assembly of claim 1, wherein the light transmitting portion of the vehicle indicia element is disposed at a passageway through the vehicle indicia element.

3. The vehicle indicia assembly of claim 1, wherein the vehicle indicia element comprises a passageway that extends partially through the vehicle indicia element and wherein the passageway does not extend through the indicia surface.

4. The vehicle indicia assembly of claim 1, wherein the vehicle camera has a lens assembly and wherein the lens assembly is disposed at and behind the light transmitting portion of the vehicle indicia element.

5. The vehicle indicia assembly of claim 4, wherein the light transmitting portion of the vehicle indicia element is disposed at a passageway through the vehicle indicia element and wherein the lens assembly is received at least partially through the passageway.

6. The vehicle indicia assembly of claim 5, wherein the light transmitting plastic element is disposed at an outer end of the lens assembly of the vehicle camera and matches the indicia surface at and around the passageway.

7. The vehicle indicia assembly of claim 6, wherein the light transmitting plastic element is at least partially coated with a coating that matches the indicia surface at and around the passageway.

8. The vehicle indicia assembly of claim 6, wherein the light transmitting plastic element comprises a material that matches the indicia surface at and around the passageway.

9. The vehicle indicia assembly of claim 5, wherein the light transmitting plastic element is flush with an edge of indicia surface at and around the passageway.

10. The vehicle indicia assembly of claim 5, wherein a lens optic of the lens assembly has an outward-facing surface having a curvature that corresponds with the curvature of the light transmitting plastic element at the passageway.

11. The vehicle indicia assembly of claim 10, wherein the lens assembly comprises a wide-angle lens assembly.

12. The vehicle indicia assembly of claim 10, wherein the lens assembly has at least a 130 degree field of view.

13. The vehicle indicia assembly of claim 10, wherein the vehicle camera is positioned relative to the vehicle indicia element to horizontally align the lens assembly when the vehicle indicia assembly is mounted at the vehicle.

14. The vehicle indicia assembly of claim 1, further comprising a camera controller operable to adjust image data captured by the vehicle camera to compensate for optical distortion.

15. The vehicle indicia assembly of claim 14, wherein the camera controller is operable to adjust image data captured by the vehicle camera to compensate for optical distortion below the horizontal.

16. The vehicle indicia assembly of claim 1, wherein the vehicle camera comprises a housing and wherein the housing and the attaching surface are configured to mount the vehicle indicia assembly at a body portion of the vehicle.

17. The vehicle indicia assembly of claim 1, wherein the vehicle camera is mounted to the vehicle indicia element and wherein the vehicle indicia assembly is mounted at a vehicle as a unit.

18. The vehicle indicia assembly of claim 1, wherein the indicia surface includes a graphical portion and a background portion, and wherein the light transmitting portion is at the background portion.

19. The vehicle indicia assembly of claim 1, wherein the vehicle camera has a vertical field of view at least 125 degrees.

20. The vehicle indicia assembly of claim 1, wherein the indicia established at the indicia surface is representative of at least one of a vehicle emblem, a vehicle manufacturer logo, a vehicle manufacturer name, a vehicle manufacturer identifier, a vehicle model logo, a vehicle model name, a vehicle model identifier and a vehicle model brand.

21. A vehicle indicia assembly suitable for use on a vehicle, the vehicle indicia assembly comprising:
   a vehicle indicia element, the vehicle indicia element having an indicia surface with indicia established thereat, the indicia representative of at least one of a vehicle emblem, a vehicle manufacturer logo, a vehicle manufacturer name, a vehicle manufacturer identifier, a vehicle model logo, a vehicle model name, a vehicle model identifier and a vehicle model brand, wherein the vehicle indicia element has an attaching surface opposite the indicia surface;
   wherein the attaching surface of the vehicle indicia element is configured to be fixedly mounted at a vehicle so that, when the vehicle indicia element is fixedly mounted at the vehicle, the indicia surface faces outwards away from the vehicle;
   wherein the vehicle indicia element has a light transmitting portion, and wherein the light transmitting portion comprises a light transmitting plastic element having an outer surface curvature that corresponds with the indicia surface around the light transmitting portion;
   wherein the indicia surface includes a graphical portion and a background portion, and wherein the light transmitting portion is at the background portion;
   a vehicle camera fixedly disposed at the attaching surface of the vehicle indicia element to establish a modular vehicle indicia assembly, wherein the vehicle camera is fixedly positioned at the vehicle indicia element so that the vehicle camera views through the light transmitting portion and is operable to capture image data; and
   wherein, when the vehicle indicia assembly is fixedly mounted at the vehicle as a unit, the vehicle camera is disposed at the vehicle and views through the light transmitting portion of the vehicle indicia element and is operable to capture image data representative of a scene exterior the vehicle.

22. The vehicle indicia assembly of claim 21, wherein the vehicle indicia element comprises a passageway through the vehicle indicia element, and wherein the light transmitting portion is disposed at the passageway, and wherein a lens of the vehicle camera is at least partially received in the passageway.

23. The vehicle indicia assembly of claim 21, wherein the light transmitting plastic element comprises a material that transmits light therethrough.

24. A method of mounting a vehicle indicia assembly at a vehicle, the method comprising:
   mounting a vehicle camera at a vehicle indicia element to form a modular vehicle indicia assembly, the vehicle camera positioned at and behind a light transmitting portion of the vehicle indicia element when mounted thereat, wherein the light transmitting portion comprises a light transmitting plastic element having an outer surface curvature that corresponds with an indicia surface of the vehicle indicia element around the light transmitting portion; and
   mounting the vehicle indicia assembly at a vehicle as a unit, wherein, when the vehicle indicia assembly is mounted at the vehicle, the indicia surface of the vehicle indicia element faces outwards from the vehicle and the vehicle camera also faces outwards and views through the light transmitting portion to capture image data representative of a scene exterior the vehicle.

25. The method of claim 24, wherein mounting the vehicle indicia assembly at the vehicle comprises mounting a housing of the vehicle camera at a body of the vehicle.

26. The method of claim 24, wherein the vehicle indicia element comprises a passageway through the vehicle indicia element, and wherein the light transmitting portion is disposed at the passageway.

* * * * *